Patented Jan. 11, 1944

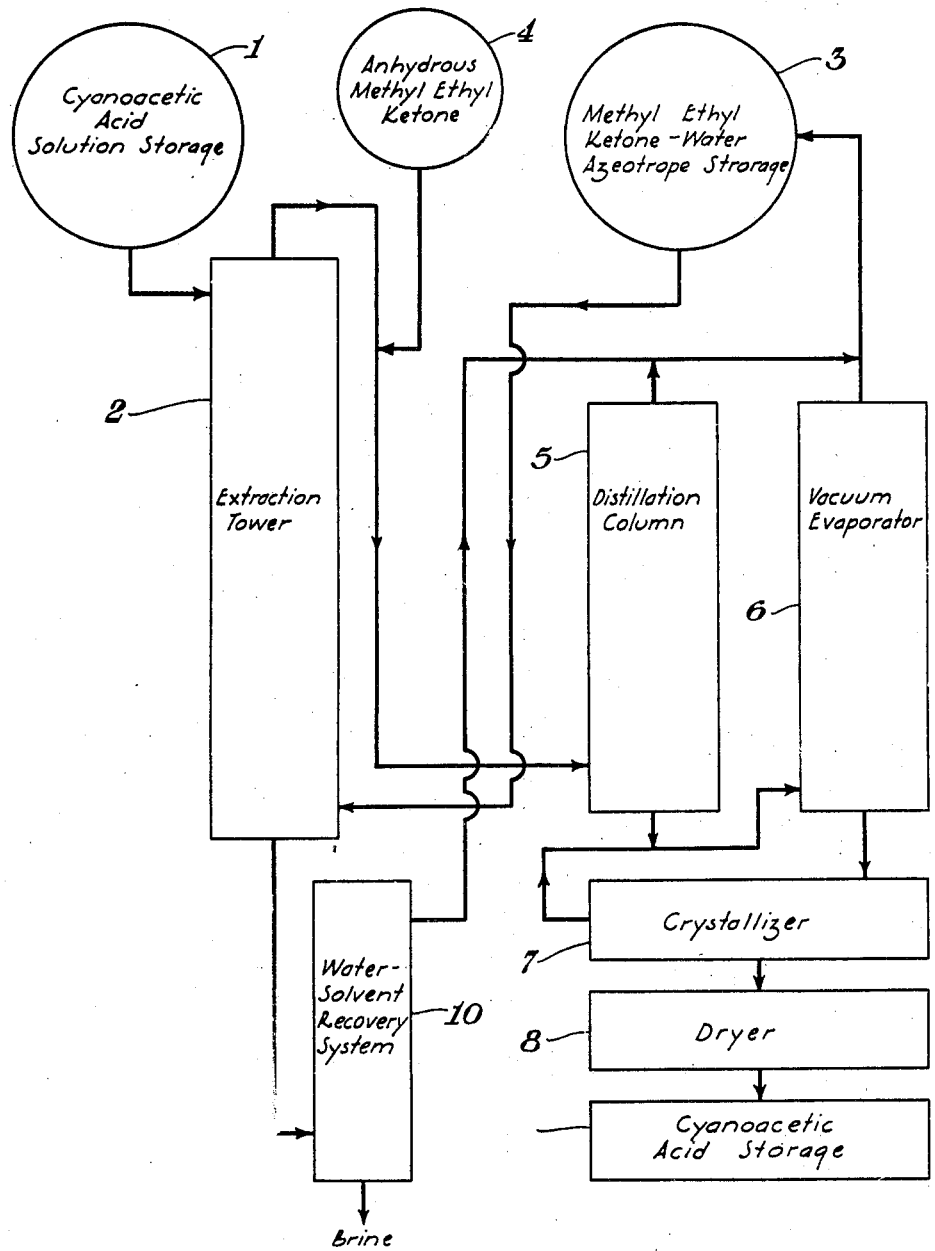

2,338,834

UNITED STATES PATENT OFFICE 2,338,834

RECOVERY OF CYANOACETIC ACID FROM AQUEOUS INORGANIC SALT SOLUTIONS THEREOF

Edgar C. Britton and Luther F. Berhenke, Midland, Mich., assignors to The Dow Chemical Company, Midland, Mich., a corporation of Michigan Application April 17, 1942, Serial No. 439,302

7 Claims. (Cl. 260—464)

This invention relates to an improved method for recovering cyanoacetic acid from aqueous inorganic salt solutions thereof, and in particular concerns a method wherein certain solvents are employed for such purpose.

Cyanoacetic acid is ordinarily made by reacting sodium chloroacetate with aqueous sodium cyanide and thereafter acidifying with hydrochloric acid. Usually the reaction mixture is treated with a calcium salt whereby insoluble calcium cyanoacetate is precipitated and the latter product is treated with sulfuric acid to form free cyanoacetic acid and calcium sulfate. The latter is filtered from the mixture and the filtrate is evaporated until the acid product crystallizes out of solution. A somewhat simplified mode of procedure consists in treating the crude reaction mixture directly with a mineral acid to form free cyanoacetic acid, which is then recovered from the acidified solution by evaporation and crystallization. When operating according to such known procedures, however, considerable difficulty is encountered in recovering the free acid in pure form and in good yield from the acidified aqueous solution. Cyanoacetic acid is quite soluble in water and undergoes decomposition when subjected to temperatures at or near the boiling point of water. Accordingly, in concentrating aqueous cyanoacetic acid solutions to crystallize the acid therefrom, it is necessary to evaporate a large volume of water while avoiding temperatures near the boiling point, a procedure which is both time-consuming and expensive. Furthermore, the metal salts usually present in the cyanoacetic acid solution have solubilities in water comparable to that of the acid with the result that, even though the evaporation is very carefully controlled, the cyanoacetic acid recovered is almost invariably contaminated with small amounts of such inorganic salts.

It is an object of this invention to provide a simple, economical method for recovering cyanoacetic acid from aqueous inorganic salt-containing solutions thereof, such as are obtained in the manufacture of the acid.

We have found that the above-mentioned difficulties can be avoided and that a high quality cyanoacetic acid can readily be recovered in good yield from aqueous inorganic salt solutions containing the same by extracting such solutions with a selective solvent comprising an aliphatic ketone containing from 4 to 5 carbon atoms; i. e., methyl ethyl ketone, methyl propyl ketone, methyl isopropyl ketone, and diethyl ketone; and thereafter recovering the acid from the extract. These solvents are mobile liquids which form low boiling azeotropes with water and have limited solubility in aqueous inorganic salt solutions. They are superior to solvents which have been used as extractants for the lower fatty acids in that they have excellent solvent power for cyanoacetic acid and under the conditions of the present extraction do not react therewith to any significant degree. Accordingly, they are well adapted for use as extractants in recovering cyanoacetic acid from aqueous salt solutions. They may be employed alone or in admixture with each other or in combination with other solvents such as hydrocarbons, ethers, chlorinated hydrocarbons, etc.

The following table presents data illustrating the effectiveness of the ketones of the present invention as extractants for cyanoacetic acid. In each experiment an approximately 20 per cent by weight sodium chloride brine containing the acid was shaken with an equal volume of the ketone and the amount of acid present in the ketone layer was determined by analysis. The table gives the concentration of the acid in the aqueous brine prior to the extraction and, also, the per cent by weight of the acid initially present which was extracted from the brine solution by the solvent.

Table I

| Extractant | Acid concentration in brine | Acid extracted |
|---|---|---|
| | Per cent by weight | Per cent |
| Methyl ethyl ketone | 10.6 | 77 |
| Do | 20.8 | 79 |
| Methyl propyl ketone | 10.6 | 64 |
| Methyl isopropyl ketone | 9.9 | 67 |
| Do | 20.8 | 67 |
| Diethyl ketone | 20.8 | 59 |

In extracting cyanoacetic acid from aqueous inorganic salt solutions according to the invention, we prefer to operate in a continuous manner. The continuous process consists essentially in passing the extractant, which comprises at least one of the ketones of the present class, upwardly through a vertical extraction tower counter-current to a descending stream of the acid solution. In order to obtain a large area of contact between the two phases and thereby secure more efficient extraction, the extraction tower may be packed or the solvent may be forced through a spray nozzle or similar device at the bottom of the extraction tower so that the solvent rises in highly dispersed form through the descending stream of aqueous acid extracting more and more acid as it ascends.

The extract which is withdrawn from the top of the tower consists essentially of a solution of the acid in the ketone extractant and a small amount of dissolved water. This extract is concentrated by distilling off the solvent, and the acid is crystallized from the concentrated solution. Most of the water contained in the extract is distilled off along with the ketone in the form of an azeotropic mixture. The aqueous phase which is withdrawn from the bottom of the extraction tower usually contains a small amount of the ketone extractant in solution, and the latter may be recovered therefrom by distillation.

The solvents may be employed in the form of their azeotropic mixtures with water, and, in fact, such mode of operation is to be preferred when extracting cyanoacetic acid from solutions containing high concentrations of dissolved inorganic salts. Since an anhydrous ketone extractant continuously removes a small amount of water during the extraction process, the aqueous salt solution may become concentrated to the point where the salt precipitates from solution and clogs the apparatus. By employing the ketone in the form of its azeotropic mixture with water, only a small additional amount of water is removed during the extraction and the tendency toward salt precipitation is greatly reduced. Ordinarily this mode of operation is effected simply by employing a cyclic process wherein the azeotropic mixture obtained during concentration of the organic acid extract is returned to the bottom of the extraction tower and re-employed as the extractant. Table 2 shows the boiling points of the azeotropes of water with each of the ketones of the present invention and, also, the per cent by weight of water present in the azeotrope.

Table II

| Solvent | Boiling point of azeotrope | Weight per cent water |
|---|---|---|
| | °C. | |
| Methyl ethyl ketone | 73 | 11 |
| Methyl propyl ketone | 83 | 13.5 |
| Methyl isopropyl ketone | 79 | 13 |
| Diethyl ketones | 83 | 14 |

A preferred embodiment of the invention is illustrated in the accompanying drawing which shows diagrammatically the flow of materials in the continuous counter-current extraction of cyanoacetic acid. Referring now to the drawing: A crude aqueous cyanoacetic acid solution, such as that obtained by reacting sodium chloroacetate with aqueous sodium cyanide and thereafter acidifying the reaction mixture with hydrochloric or sulfuric acid, is led continuously from a tank 1 into the top of a vertical extraction tower 2. The extractant, preferably consisting of the azeotropic mixture of water and methyl ethyl ketone, is led from a solvent storage tank 3 into the bottom of the extraction tower 2 wherein it rises through the descending stream of cyanoacetic acid solution, extracting the acid as it ascends. Accordingly, the liquid leaving the top of the tower 2 consists of a solution of cyanoacetic acid in methyl ethyl ketone containing a small amount of dissolved water. If desired, this solution may be diluted with a small amount of anhydrous methyl ethyl ketone, withdrawn from a storage tank 4, in order that in the subsequent evaporation step there may be sufficient methyl ethyl ketone present to remove all of the water as an azeotropic mixture. The extract is led into a distillation column 5 where a portion of the methyl ethyl ketone and water is distilled off as an azeotropic mixture and is returned to the solvent storage tank 3. The extract is further concentrated in a vacuum evaporator 6, and the concentrated liquor is allowed to crystallize in a crystallizer 7. The crystalline cyanoacetic acid taken from the crystallizer 7 is passed through a drier 8 and thence to a storage bin 9. The extractant recovered from the vacuum evaporator 6 is returned to the solvent storage tank 3 and the mother liquor from the crystallizer 7 is returned to the vacuum evaporator 6. The mixture leaving the bottom of the extraction tower 2 consists of an aqueous sodium chloride or sodium sulfate brine and contains a small amount of dissolved methyl ethyl ketone. If desired, this mixture may be passed into a recovery system 10, where the methyl ethyl ketone is distilled off and returned to the solvent storage tank 3. The aqueous inorganic salt solution withdrawn from the recovery system 10 may be discarded or it may be further treated to recover the salt.

*Example*

26.0 kilograms of a 10.7 per cent aqueous cyanoacetic acid solution, obtained by reacting sodium chloroacetate with aqueous sodium cyanide and thereafter acidifying with hydrochloric acid, was continuously extracted with methyl ethyl ketone as described above, the relative rates of flow of the extractant and acid solution being approximately 1.5 to 1.0, respectively. The extract was concentrated by evaporation and thereafter cooled to crystallize the cyanoacetic acid therefrom. There was obtained 2.0 kilograms of crystalline cyanoacetic acid and 366 grams of a mother liquor which was found by analysis to contain 216 grams of cyanoacetic acid, corresponding to a total yield of about 80 per cent of the theoretical.

This application is a continuation-in-part of our copending application Serial No. 307,868, filed December 6, 1939.

We claim:

1. A process for recovering cyanoacetic acid from an aqueous inorganic salt solution thereof, which comprises extracting the acid from said solution with a solvent comprising an aliphatic ketone containing from 4 to 5 carbon atoms.

2. A process for recovering cyanoacetic acid from an aqueous inorganic salt solution thereof, which comprises extracting the acid from said solution with a solvent consisting essentially of water and an aliphatic ketone containing from 4 to 5 carbon atoms in substantially azeotropic proportions.

3. A process for recovering cyanoacetic acid from an aqueous inorganic salt solution thereof, which comprises extracting the acid from said solution with methyl ethyl ketone.

4. A process for recovering cyanoacetic acid from an aqueous inorganic salt solution thereof, which comprises extracting the acid from said solution with methyl propyl ketone.

5. In a continuous process for the recovery of cyanoacetic acid from an aqueous inorganic salt solution thereof, the steps which consist in passing said solution downwardly through a vertical extraction tower counter current to an ascending stream of an extractant comprising an aliphatic ketone containing from 4 to 5 carbon atoms, withdrawing the extract from the top of the tower, concentrating the extract by distillation of the ketone solvent, and thereafter permitting the cyanoacetic acid to crystallize from the concentrated solution.

6. In a continuous process for the recovery of cyanoacetic acid from an aqueous inorganic salt solution thereof, the steps which consist in passing said solution downwardly through a vertical extraction tower counter current to an ascending stream of an extractant consisting essentially of methyl ethyl ketone and water in substantially azeotropic proportions, withdrawing the extract from the top of the tower, concentrating the extract by distillation of the ketone solvent, and thereafter permitting the cyanoacetic acid to crystallize from the concentrated solution.

7. In a continuous process for the recovery of cyanoacetic acid from an aqueous inorganic salt solution thereof, the steps which consist in passing said solution downwardly through a vertical extraction tower counter current to an ascending stream of an extractant consisting essentially of methyl propyl ketone and water in substantially azeotropic proportions, withdrawing the extract from the top of the tower, concentrating the extract by distillation of the ketone solvent, and thereafter permitting the cyanoacetic acid to crystallize from the concentrated solution.

EDGAR C. BRITTON.
LUTHER F. BERHENKE.